United States Patent
Mugunda et al.

(10) Patent No.: US 12,130,932 B2
(45) Date of Patent: Oct. 29, 2024

(54) COMMUNICATION PATH OBFUSCATION SYSTEM AND METHOD

(71) Applicant: Dell Products, L.P., Round Rock, TX (US)

(72) Inventors: Chandrasekhar Mugunda, Austin, TX (US); Rama Rao Bisa, Bangalore (IN); Viswanath Ponnuru, Bangalore (IN); Dharma Bhushan Ramaiah, Bengaluru (IN); Shinose Abdul Rahiman, Bangalore (IN); Vineeth Radhakrishnan, Bangalore (IN); Chitrak Gupta, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 403 days.

(21) Appl. No.: 17/381,456

(22) Filed: Jul. 21, 2021

(65) Prior Publication Data

US 2023/0008238 A1   Jan. 12, 2023

(30) Foreign Application Priority Data

Jul. 8, 2021   (IN) .............................. 202111030711

(51) Int. Cl.

| | |
|---|---|
| G06F 21/60 | (2013.01) |
| G06F 9/4401 | (2018.01) |
| G06F 13/40 | (2006.01) |
| G06F 13/42 | (2006.01) |
| G06F 21/85 | (2013.01) |

(52) U.S. Cl.
CPC .......... *G06F 21/606* (2013.01); *G06F 9/4401* (2013.01); *G06F 13/4031* (2013.01); *G06F 13/405* (2013.01); *G06F 13/4282* (2013.01); *G06F 21/85* (2013.01); *G06F 2213/0016* (2013.01); *G06F 2221/2125* (2013.01)

(58) Field of Classification Search
CPC ........ G06F 21/606; G06F 21/14; G06F 21/85; G06F 2213/0016; G06F 13/4282
See application file for complete search history.

(56) References Cited

U.S. PATENT DOCUMENTS

| | | | | |
|---|---|---|---|---|
| 11,354,259 | B1* | 6/2022 | Hilland | G06F 9/4406 |
| 11,556,839 | B1* | 1/2023 | Vona | G06F 16/2365 |
| 2003/0115364 | A1* | 6/2003 | Shu | H04L 45/00 |
| | | | | 709/246 |
| 2009/0083760 | A1* | 3/2009 | Slaight | G06F 13/4022 |
| | | | | 719/313 |

(Continued)

OTHER PUBLICATIONS

"Yao et al., Device Security, Oct. 28, 2020, aPress, pp. 257-312" (Year: 2020).*

*Primary Examiner* — Dao Q Ho
(74) *Attorney, Agent, or Firm* — Fogarty LLP (57) ABSTRACT

According to one embodiment, a path obfuscation system includes first and second hardware devices, and first and second interfaces configured to provide communication between the first and second hardware devices using a security protocol and data model (SPDM) protocol. The first hardware device comprises computer-executable instructions to receive a message to be transmitted to the second hardware device, segment the message into multiple groups of packets, and randomly select either the first or second interface to transmit each group of packet to the second hardware device.

17 Claims, 4 Drawing Sheets

(56) References Cited

U.S. PATENT DOCUMENTS

2018/0176121 A1* 6/2018 Jayaraman .............. H04L 45/20
2021/0397577 A1* 12/2021 Kahn .................. H04L 67/1097
2023/0008238 A1* 1/2023 Mugunda .............. G06F 21/606

* cited by examiner

COMMUNICATION PATH OBFUSCATION SYSTEM AND METHOD

CROSS REFERENCE TO RELATED APPLICATIONS

This patent application claims priority to co-pending, commonly assigned Indian Patent Application No. 202111030711, filed Jul. 8, 2021 and entitled "Communication Path Obfuscation System and Method;" the entire contents of which are incorporated by reference herein.

FIELD

This disclosure relates generally to Information Handling Systems (IHSs), and more specifically, to a communication path obfuscation system and method for SPDM-enabled hardware devices.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware, and software components that may be configured to process, store, and communicate information and may include one or more computer systems, data storage systems, and networking systems.

In modern day IHSs, administrative management is often provided via baseboard management controllers (BMCs). The baseboard management controller (BMC) generally includes a specialized microcontroller embedded on the motherboard of the IHS, and provides an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take some corrective actions, such as resetting or power cycling the system to get a hung O/S running again. These abilities save on the total cost of ownership of an IHS, particularly when implemented in large clusters, such as server farms.

SUMMARY

According to one embodiment, a path obfuscation system includes first and second hardware devices, and first and second interfaces configured to provide communication between the first and second hardware devices using a security protocol and data model (SPDM) protocol. The first hardware device comprises computer-executable instructions to receive a message to be transmitted to the second hardware device, segment the message into multiple groups of packets, and randomly select either the first or second interface to transmit each group of packets to the second hardware device.

According to yet another embodiment, a path obfuscation method includes the steps of receiving a message to be transmitted from a first hardware device to a second hardware device, segmenting the message into multiple groups of packets, and randomly selecting either a first or second interface to transmit each group of packets to the second hardware device. The first and second interfaces providing communication between the first and second hardware devices using a SPDM protocol.

According to yet another embodiment, an Information Handling System (IHS) includes multiple hardware devices, and a baseboard Management Controller (BMC) in communication with the plurality of hardware devices. The BMC includes executable instructions for receiving a message to be transmitted to the hardware device, segmenting the message into multiple groups of packets, and randomly selecting either the first or second interface to transmit each group of packets to the hardware device.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

A security protocol and data model (SPDM) specification has been published, which defines messages and procedures for communication among hardware devices, and is generally agnostic to the type of communication channel used. For example, SPDM-enabled hardware devices may communicate with each other using communication interfaces (e.g., paths), such as inter-integrated circuit (I2C) connections, i3c SENSEWIRE connections, or serial peripheral interface (SPI) based connections. Additionally, the SPDM-enabled hardware devices may also communicate with each other through a system bus of an information handling system (IHS) using a Management Component Transport Protocol (MCTP) PCIe vendor defined message (VDM) channel. Thus, the SPDM specification provides for numerous communication paths to conduct message exchanges among SPDM-enabled hardware devices.

The SPDM specification is generally path agnostic in that it can support messaging among hardware devices over differing interfaces. Conventional implementations of SPDM-based systems, however, have not heretofore taken advantage of the multi-path messaging capabilities provided by the SPDM specification. It has been learned, for example, that communication over a single path can cause potential security exposures even when encryption is used due to that path being known to would be intruders. Embodiments of the present disclosure provide a solution to this problem, among others, using a path obfuscation system and method that randomizes communication paths provided for SPDM-enabled hardware devices so that the security of the communication is enhanced.

Baseboard management controllers (BMCs) are particularly well suited for the features provided by the SPDM specification. A BMC generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of certain hardware devices in the IHS. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

The SPDM specification introduces device authentication, firmware measurements and payload encryption for BMCs. Conventional implementations of SPDM-enabled BMCs, nevertheless, use only one physical interface in the various phases of SPDM workflows. If the communication is confined to a single interface, the threat of confined vulnerability for attacks increases. Knowing the pattern and protocol behavior from a single known source makes it easier for the attacker to break the security. As will be described in detail herein below, embodiments of the present disclosure provide a solution to this problem, among others, by enhancing the informational entropy of communications by randomizing the selection of communication interfaces during message transfer.

Embodiments of the present disclosure provide a communication path obfuscation system and method that leverages the multi-interface capabilities of SPDM-enabled hardware devices to randomly send messages through each of multiple interfaces so that the security of the messages is enhanced. That is, randomly transmitting packets over differing interfaces may thwart illicit monitoring of the secure messages as well as mitigating man-in-the-middle attacks by obfuscating the path that is taken to send and receive the messages between the SPDM-enabled hardware devices.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

Figure 1:
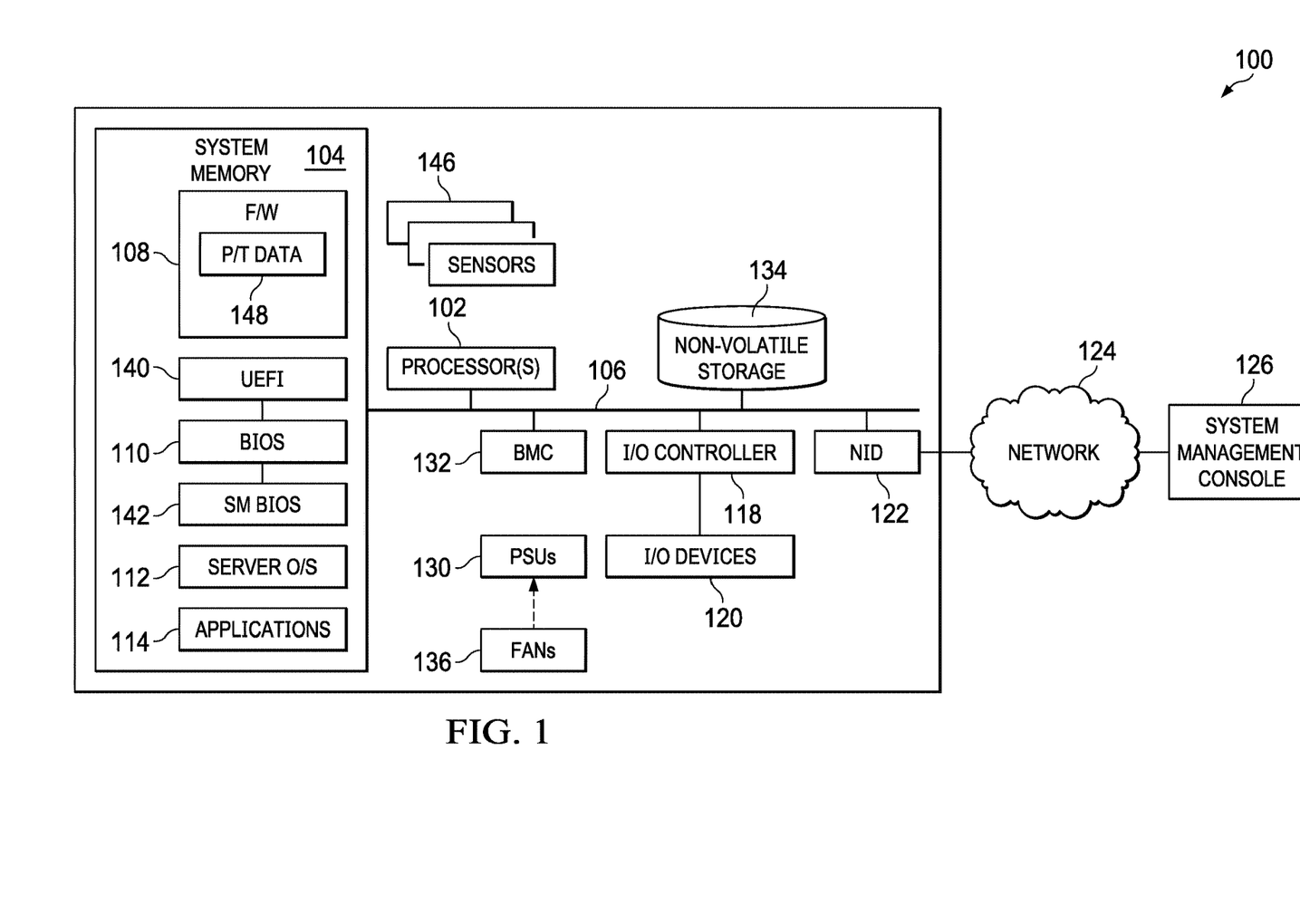
FIG. 1 shows an example of an IHS configured to implement a path obfuscation system and method according to one embodiment of the present disclosure.

FIG. 1 shows an example of an IHS 100 configured to implement a path obfuscation system and method according to one embodiment of the present disclosure. For example, IHS 100 may be implemented as any desktop, laptop, or tablet computing device in the form of a client device or IHS. IHS 100 includes one or more processor(s) 102 coupled to system memory 104 via system interconnect 106. System interconnect 106 may include any suitable system bus. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of an IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more power supply units (PSUs) 130. PSUs 130 are coupled to a BMC 132 via an I²C bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, PSUs 130, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC). As a non-limiting example, the BMC 132 may be an integrated Dell Remote Access Controller (iDRAC) from Dell® that is embedded within a Dell PowerEdge™ server to provide functionality that helps information technology (IT) administrators deploy, update, monitor, and maintain servers remotely.

Figure 2:
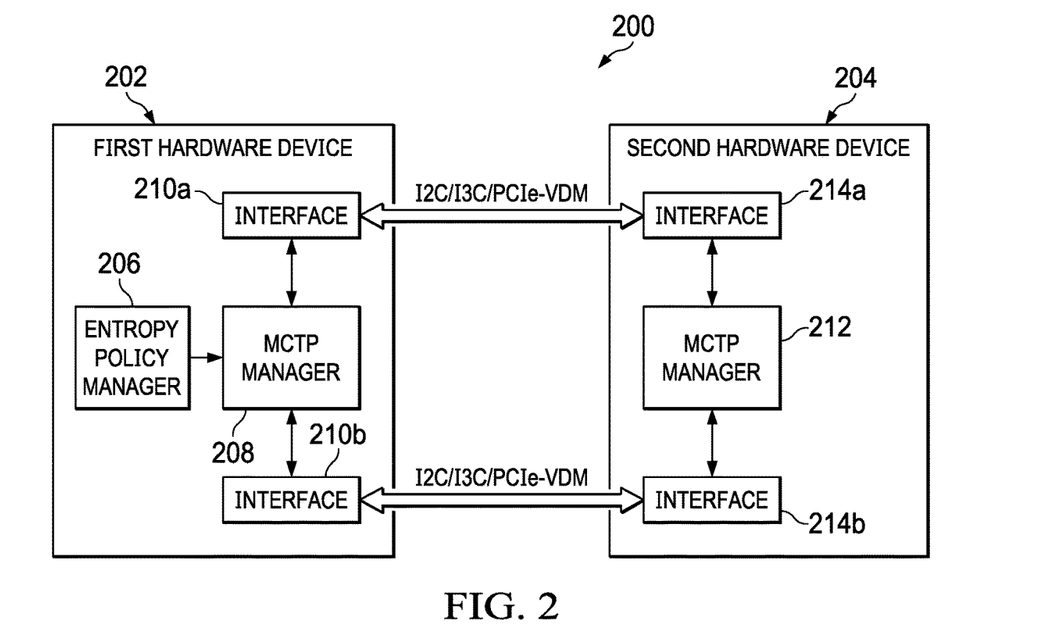
FIG. 2 illustrates an example path obfuscation system according to one embodiment of the present disclosure.

FIG. 2 illustrates an example path obfuscation system 200 according to one embodiment of the present disclosure. The system 200 includes a first hardware device 202 and a second hardware device 204. The first hardware device 202 includes an entropy policy manager 206, a MCTP manager 208, and two interfaces 210a, 210b. The second hardware device 204, on the other hand, includes a MCTP manager 212, and two interfaces 214a, 214b. The first hardware device 202 can be considered to be a hub that manages secure communications with multiple second hardware devices 204. For example, the first hardware device 202 may be a BMC 132 that provides secure communications with multiple second hardware devices 204 of an IHS 100. As another example, the first hardware device 202 may be one of multiple hardware devices of an IHS 100 that provides secure communications with a second hardware device 204 embodied as a BMC 132 configured in the IHS 100.

The entropy policy manager 206 defines the behavior of the secure message transmission and how much obfuscation is to be used in each transmission. For example, the entropy policy manager 206 may receive a message to be transmitted to the second hardware device 204, segment the message into a plurality of groups of packets, and randomly select either the first or second interface to transmit each group of packets to the second hardware device 204.

The entropy policy manager 206 uses the concept of informational entropy in which a random variable is the average level of uncertainty inherent in the random variable's possible outcomes. In the present case, the entropy policy manager 206 determines a level of randomness to how either of the two interfaces 210a, 210b are selected for transmitting portions of a message to the remotely configured interface 214a, 214b. The randomness may include how often a different interface is selected, and a duration (e.g., chunk size) of how much data is conveyed through each interface 210a, 210b. The entropy policy manager 206 may segment a message into multiple groups of packets each having different sizes (i.e., quantity of packets). The entropy policy manager 206 may then randomly select either of the available interfaces 210a, 210b for transmitting each of the randomly sized groups of packets to the receiving hardware device 204. For example, the entropy policy manager 206 may transmit a first group of three packets through the first interface 210a, followed by transmission of a second group of two packets through the second interface 210b, which is again followed by transmission of a third group of five packets through the first interface 210a and so on using both interfaces 210a, 210b until all of the message is transmitted to the second hardware device 204. A similar technique may be employed to transmit other groups of packets of another message from the second hardware device 204 to the first hardware device 202.

The entropy policy manager 206 may also determines which channel to use for transmission of keys, certificates, and the like to the second hardware device 204. The Entropy manager randomizes the selection of channel, chunk size of the security payload. Additionally, the entropy policy manager 206 may create appropriate headers for the MCTP manager 208 to transmit each of the group of packets. In one embodiment, the entropy policy manager 206 may transmit one or more policies associated with randomization of the groups of packets to the MCTP manager 212 at the remotely configured hardware device 204 so that the 2-way communication (e.g., both directions) between the first and second hardware device 202, 204 is performed at the same level of randomness.

The MCTP manager 208 may aggregate the groups of packets received by the interfaces 210a, 210b to frame a complete message at the receiving endpoint. In general, the MCTP manager 208 uses a management component transport protocol (MCTP) for packetizing messages at the transmitting hardware device 202, 204, and de-packetizing messages at the receiving hardware device 202, 204. In one embodiment, the MCTP manager 208 may generate and include a sequence number for each packet so that the message can be re-constructed by the MCTP manager 208 at the remote hardware device 202, 204. The CMTP manager 212 of the second hardware device 204 performs similar features for its interfaces 214a, 214b.

The first and second interfaces 210a, 210b, 214a, and 214b of each hardware device 202, 204 transmit and receive messages in the form of packets. The first and second interfaces 210a, 210b may transmit the messages in any SPDM-based format, such as an I2C protocol, an I3C SENSEWIRE protocol, a SPI protocol, and a PCIe VDM channel. Although the example path obfuscation system 200 is shown and described having two different interfaces 210a, 210b, it should be appreciated that in other embodiments, a path obfuscation system may include other quantities of interfaces, such as three or more different interfaces. The first and second interfaces 214a, 214b of the second hardware device 204 are generally similar in design and construction to the first and second interfaces 210a, 210b of the first hardware device 202.

Figure 3:
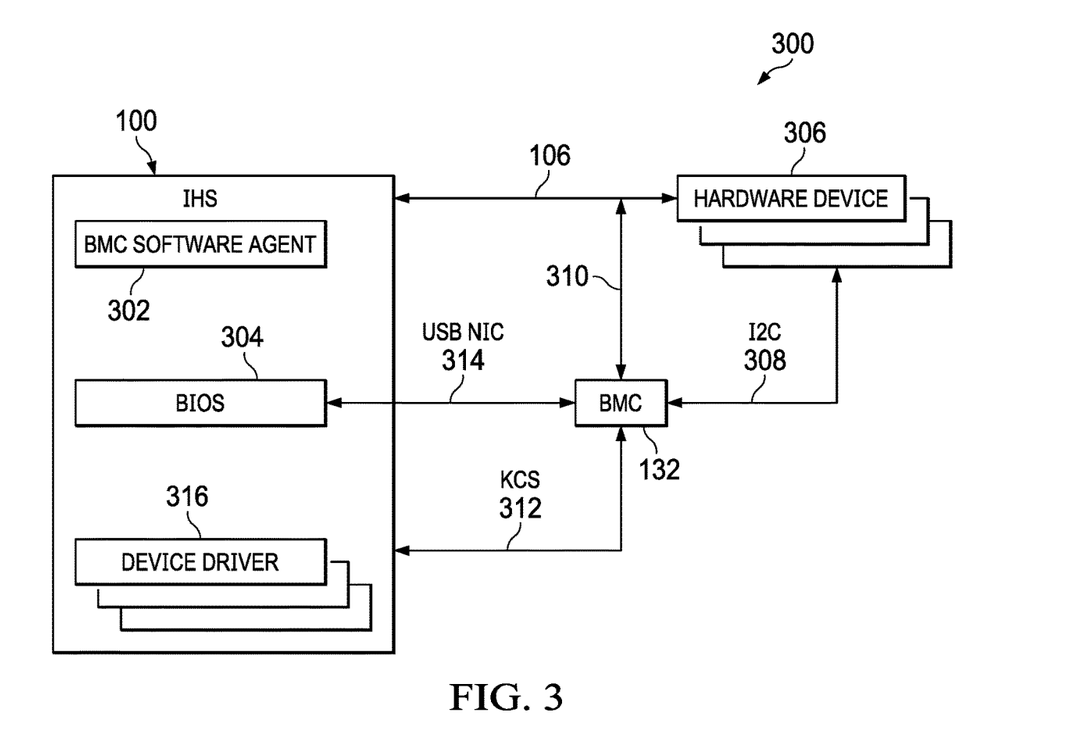
FIG. 3 is a diagram illustrating several components of an example BMC along with those of an associated IHS showing how those components may signal one another for implementing the BMC-based path obfuscation system according to one embodiment of the present disclosure.

FIG. 3 is a diagram 300 illustrating several components of an example BMC 132 along with those of an associated IHS 100 showing how those components may signal one another for implementing the BMC-based path obfuscation system according to one embodiment of the present disclosure. The IHS 100 is shown with a BMC software agent 302 and a basic input output system (BIOS) 304, and one or more device drivers 316 that are each associated with one of the hardware devices 306. The IHS 100 also includes one or more hardware devices 306, such as graphics processing cards, network interface cards, input/output (I/O) (e.g., USB) expansion port cards, Wi-Fi interface cards, storage controller cards, and the like. For example, the hardware devices 206 may be an I/O controller 118, a NID 122, or a storage controller configured to manage the non-volatile storage 134, such as described herein above. Each hardware device 306 communicates with the IHS 100 via system bus 106. In one embodiment, system bus 106 may include a Peripheral Component Interconnect Express (PCIe) bus.

According to certain embodiments of the present disclosure, the hardware device 306 may comprise any removable device that communicates using the Security Protocol and Data Model (SPDM) protocol. Within this disclosure, a removable device may be any type that can be added to or removed from the IHS 100. In some cases, the hardware device 306 can be hot-plugged into the IHS 100. That is, the hardware device 306 can be added to, or removed from the IHS 100 while it is running.

The BMC 132 communicates with each of multiple hardware devices 306 via an i2c connection 308 such as described above. In other embodiments, the BMC 132 may communicate with each of the hardware devices 306 using other communication protocol, such as i3c SENSEWIRE connections, or serial peripheral interface (SPI) based connections. Additionally, the BMC 132 may also communicate with each of the hardware devices 306 through the system bus 106 using a Management Component Transport Protocol (MCTP) PCIe vendor defined message (VDM) channel 310.

The BMC 132 may also communicate with the IHS 100 through the PCIe VDM channel 310, a Keyboard Controller Style (KCS) channel 312, and/or a USB NIC channel 314. The KCS channel 312 is provided as part of an intelligent platform management interface (IPMI) specification. In general, the IPMI specification defines several system interfaces for local access from the BMC software agent 302 and BIOS 304 to the BMC 132 of which the KCS protocol provides an ideal connection that does not require authentication for its operation.

The BMC software agent 302 is a lightweight software service that is executed on the host IHS 100 to integrate certain operating system (OS) features with the BMC 132. The BMC software agent 302 provides OS-related information to the BMC 132, and may add capabilities such as LC log event replication into the OS log, WMI support (including storage), iDRAC SNMP alerts via OS, iDRAC hard reset and remote full Power Cycle. For example, the BMC software agent 302 may be an iDRAC Service Module (iSM) that is configured to operate with the integrated Dell remote access controller (iDRAC), which are both provided by Dell Technologies.

As described above, some hardware devices, which can be physically added to and removed from IHSs can cause certain security threats if not handled properly. Many of these hardware devices are provided with their own computer executable environment capable of execution certain algorithms for providing their respective services. These algorithms, however, may include harmful (either malicious or inadvertent) code that can damage or hamper the operation the IHS. The hardware device authentication system uses an authentication scheme for safely entering the hardware devices into service for their IHSs while eliminating or reducing any potential security breaches that could be caused thereby.

During booting of the BMC 132, the hardware devices 306 are authenticated and a secure channel is established. Once authenticated, the hardware devices 306 can be trusted and I/O operations can be performed by the IHS 100. Nevertheless, certain hardware devices 306 may be hot plug capable (e.g., inserted while the IHS is running), thus yielding a security leak in which malicious code running on the hardware device may be able to access the system bus 106. Additionally, OS resource allocation and utilization by certain hardware devices 306 may start earlier then the BMC 132 (e.g., Dell's iDRAC) has a chance to authenticate the device using its sideband interface. As will be described in detail herein below, embodiments of the present disclosure cause the BIOS 304 power on self-test (POST) procedure to wait until some, most, or all hardware devices 306 are authenticated prior to allowing the POST procedure to complete.

Although FIG. 3 describes one example of an architecture that may be configured to provide a hardware device authentication system, the features of the disclosed architecture may be embodied in other specific forms without deviating from the spirit and scope of the present disclosure. For example, the IHS/BMC architecture as shown may include additional, fewer, or different components than those operations as described in the present example. As another example, while the IHS 100 is shown with those components described above for purposes of brevity and clarity of discussion, it should be appreciated that IHS 100 may be configured with additional, fewer, or different components without departing from the spirit and scope of the present disclosure.

Figure 4:
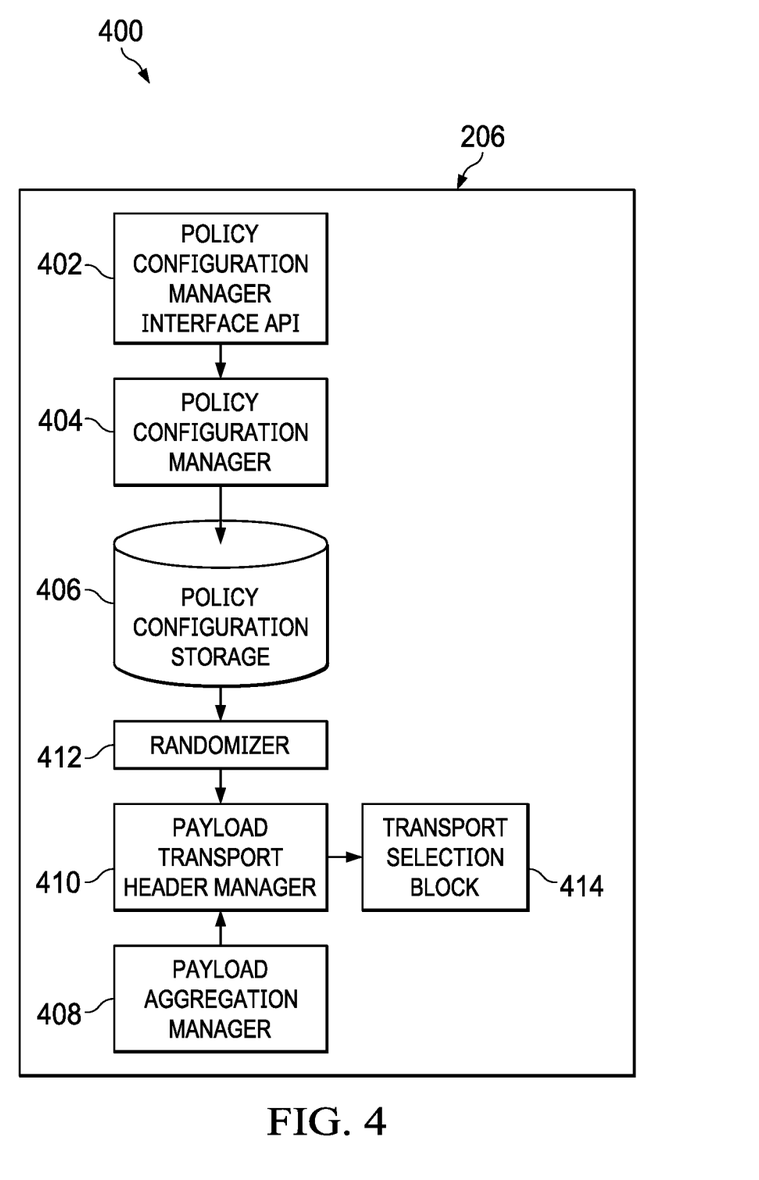
FIG. 4 illustrates several example components that may be included in the entropy policy manager according to one embodiment of the present disclosure.

FIG. 4 illustrates several example components that may be included in the entropy policy manager 206 according to one embodiment of the present disclosure. The entropy policy manager 206 includes a policy configuration manager interface API 402, a policy configuration manager 404, a policy configuration storage 406, a payload aggregation manager 408, a payload transport header manager 410, a randomizer 412, and a transport selection block 414 configured as shown.

The policy configuration manager interface API 402 presents a user interface to a user for receiving user input for setting or adjusting one or more policies associated with the operation of the path obfuscation system 200. In one embodiment, a set of policies may exist for each connected pair of hardware devices. For example, if the path obfuscation system 200 is implemented on a BMC 132 that is in communication with three hardware devices (e.g., a NIC hardware device, a storage controller hardware device, and an I/O controller hardware device), three set of policies may be provided, one for each connection between the three hardware devices and the BMC 132.

In one embodiment, the policy configuration manager interface API 402 may be configured to receive user selection of policies using a vendor defined 'SET_ENTROPY' command that is configured according to the MCTP protocol. An additional vendor defined 'SET_ENTROPY_ACK' command may also be provided so that a remote hardware device 202, 204 can acknowledge receipt of the 'SET_ENTROPY' command for providing 2-way communications with the same level of entropy.

In one embodiment, one policy may include information for determining a level of randomization to be applied to the connection. Whereas increasing the level of randomization may incur a performance penalty, a trade-off may be made between the level of randomization to be applied, and how much degradation of performance is to be tolerated. For example, the policy may indicate a range of randomization (e.g., entropy level (0 to 10) in which 0 indicates a low security level, while 10 indicates a high security level) is to be applied at the expense of performance. That is, an entropy level setting of '0' would incur a minimal amount performance degradation, while an entropy level setting of '10' would incur a maximum amount of performance degradation.

Another policy may include information about how the selected entropy is to be applied to the connection. For example, the policy may indicate a level of time duration randomization at each interface and/or an amount of data (e.g., chunk size) randomization for the size of each group of packets to be transmitted through the connection.

Yet another policy may include information for detecting that a certain event may occur, and changing other policies to mitigate the effects of the event when that event occurs. That is, the policy may include information associated with a triggering event, that when detected, causes the system to change one or more other policies to compensate for the triggered event. For an example in which the path obfuscation system is deployed on a BMC 132, the policy may include information associated with a triggering event (e.g., untrusted hardware device is hot-plugged into the IHS 100, a firmware update has been recently applied to a hardware device, a known malicious attack has recently occurred, etc.) such that when the triggering event is encountered, the system may change the policies, such as those described above, to increase the level of entropy (e.g., time duration, chunk size, etc.) that is applied to the connections of any affected hardware devices.

The policy configuration manager 404 receives and implements the policies received from the policy configuration manager interface API 402. For example, the policy configuration manager 404 may select a certain level of entropy for a given interface based upon the protocol (e.g., an I2C protocol, an I3C SENSEWIRE protocol, a SPI protocol, and a PCIe VDM channel, etc.) used by that interface, a measured level of available throughput capacity for the interface, and/or any policies associated with the interface. When the level of entropy is determined, the policy configuration manager 404 may communicate with the randomizer 412 to implement that level of randomization for that interface. The policy configuration manager 404 may also store the received policies along with any determined level randomization in the configuration storage 406 for later use, such as to maintain persistence across system re-starts.

The payload aggregation manager 408 and payload transport header manager 410 function together to packetize and de-packetize messages transmitted through the interfaces 210a, 210b. For example, the payload transport header manager 410 splits a message to be transmitted into multiple packets, each having a chunk size that is randomized according to the policies applied by policy configuration manager 404. In one embodiment, the payload transport header manager 410 includes a sequence number in each packet so that, regardless of when each packet is received at the remote hardware device 202, 204, the payload aggregation manager 408 at the remote hardware device 202, 204 can re-construct the message in its original form using the received sequence numbers.

The transport selection block 414 selects an interface 210a, 210b for transmitting each packet under control of the policies applied by the policy configuration manager 404. In one embodiment, the header of the MCTP formatted packet may include a transport select field that is populated by the policy configuration manager 404 for indicating which interface 210a, 210b is to be used for transmitting that packet. For example, when the transport selection block 414 encounters a new packet for transmission, it first reads the transport select field of the header to identify which interface 210a, 210b to use, and transmits the packet using the identified interface 210a, 210b.

Although FIG. 4 describes an example entropy policy manager 206 that may be used for path obfuscation, the features of the entropy policy manager 206 may be embodied in other specific forms without deviating from the spirit and scope of the present disclosure. For example, the entropy policy manager 206 may include additional, fewer, or different components than those described in the present examples. As another example, certain features of the entropy policy manager 206 may be performed by other components in the path obfuscation system that is different than those described above.

Figure 5:
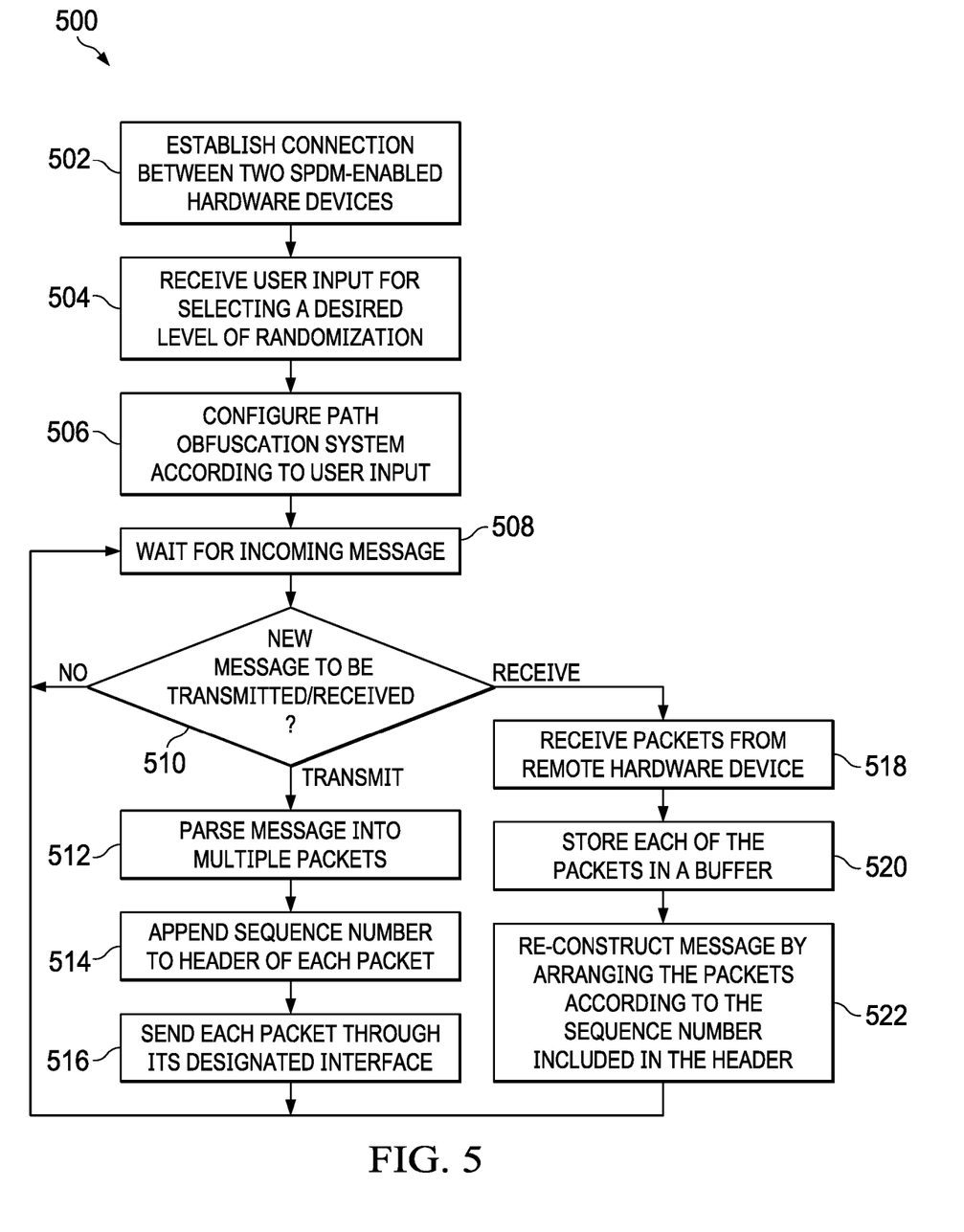
FIG. 5 depicts an example path obfuscation method that may be performed by the path obfuscation system according to one embodiment of the present disclosure.

FIG. 5 depicts an example path obfuscation method 500 that may be performed by the path obfuscation system according to one embodiment of the present disclosure. Additionally or alternatively, the method 500 may be in whole or in part performed by the path obfuscation system 200 described herein above. In one embodiment, the method 500 may be performed by two hardware devices that have multi-interface connectivity. In another embodiment, the hardware devices may include a BMC 132 configured with at least one hardware device 306 in an IHS 100.

At step 502, a connection is established between two hardware devices. The connection may be established by, for example, plugging the hardware device into a PCIe slot of a BMC configured IHS 100, or powering on a BMC configured IHS 100. Although the method 500 only describes a multi-interface connection between two devices, it should be understood that the teachings of the present method 500 may be applied to any number of hardware devices, such as a SPDM-enabled BMC 132 connected to two or more other SPDM-enabled hardware devices.

At step 504, the method 500 receives user input for selecting a desired level of randomization. Thereafter at step 506, the method configures the path obfuscation system according to user input. For example, the method 500 may generate policies based upon the received level of randomization based on certain factors associated with the connections, such as a protocol type (e.g., an I2C protocol, an I3C SENSEWIRE protocol, a SPI protocol, and a PCIe VDM channel, etc.) for each connection. In one embodiment, a vendor defined 'SET_ENTROPY' message may be sent to the remote hardware device 202, 204 so that it can prepare itself to send and receive messages using the same level of randomization that the local hardware device 202, 204 provides. At this point, the path obfuscation system has been set up and is prepared to transmit and receive messages.

At step 508, the method 500 waits for a new message to transmit or receive. At step 510, the method 500 determines if a new message is to be transmitted or received. If no new message exists, processing continues at step 508 to continue waiting for a new message. If, however, a new message is to be transmitted, processing continues at step 512; otherwise if the new message is to be received, processing continues at step 518.

At step 512, the method 500 parses the message into multiple packets. In one embodiment, the method 500 randomizes the chunk size of each group of packets using a randomizer. In another embodiment, the level of chunk size randomization is set according to one or more policies inputted by a user. In yet another embodiment, the level of chunk size randomization may be modified according to one or more other policies that instruct the method 500 to change certain policies based on detected events that occur in the IHS 100.

At step 514, the method 500 appends a sequence number to header of each packet. In addition, the method 500 may also append interface selection information to each packet. That is, the header of each packet may include information for indicating which interface 210a, 210b that the particular packet is to be transmitted through. Each packet is then sent through its designated interface 210a, 210b at step 516. In one embodiment, the interface 210a, 210b may be any type of protocol (e.g., an I2C protocol, an I3C SENSEWIRE protocol, a SPI protocol, and a PCIe VDM channel, etc.) supported by the SPDM specification. In another embodiment, the interfaces each operate according to a protocol that differs from one another.

Steps 518 through 522 describe actions that may be taken by the method 500 to receive a message from a remote hardware device 202, 204. Initially, the remote hardware device has sent, or is in the process of sending the packets of a message to the local hardware device such as described above at steps 502 through 516.

At step 518, the method 500 receives the previously parsed packets from the remote hardware device. The method 500 then stores each of the received packets in a buffer (e.g., storage) at step 520, and re-constructs the message by arranging the packets according to the sequence number included in the header at step 522. The re-constructed message may then be forwarded along to its destination. Following re-construction of the message, processing continues at step 508 to continue waiting for new messages to be transmitted or received.

The method 500 described above continues throughout operation of the connections established between the two hardware devices. Nevertheless, when use of the path obfuscation method 500 is no longer needed or desired, the process ends.

Although FIG. 5 describes an example method that may be performed for path obfuscation of messages, the features of the method 500 may be embodied in other specific forms without deviating from the spirit and scope of the present disclosure. For example, the method 500 may perform additional, fewer, or different operations than those described in the present examples. As another example, certain steps of the method 500 may be performed by other components in the IHS 100 other than those described above.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A path obfuscation system comprising:
   first and second security protocol and data model (SPDM)-enabled hardware devices; and
   first and second interfaces configured to provide communication between the first and second hardware devices using a SPDM protocol, wherein each of the first and second SPDM-enabled hardware devices are configured to communicate using the corresponding first and second interfaces with different communication protocols,
   wherein the first SPDM-enabled hardware device comprises at least one memory including instructions that upon execution by at least one processor, cause the first SPDM-enabled hardware device to:
   receive a message to be transmitted to the second hardware device;
   segment the message into a plurality of groups of packets, each group of packets selected to have a random quantity of packets based on one or more policies; and
   randomly select either the first or second interface to transmit each group of packets to the second hardware device.

2. The path obfuscation system of claim 1, wherein the first hardware device comprises a baseboard management controller (BMC).

3. The path obfuscation system of claim 1, wherein the instructions further cause the first SPDM-enabled hardware device to randomly select the first or second interface according to one or more policies established for the communication between the first and second hardware devices, wherein at least one of the policies specifies how the first or second interfaces are randomly selected.

4. The path obfuscation system of claim 3, wherein the instructions further cause the first SPDM-enabled hardware device to receive the policies from a user via a user interface.

5. The path obfuscation system of claim 3, wherein the instructions further cause the first SPDM-enabled hardware device to:
    detect an event that occurs to an Information Handling System (IHS) in which the first and second SPDM-enabled hardware devices are configured;
    based on at least one of the policies, change one or more of the other policies in response to the detected event.

6. The path obfuscation system of claim 1, wherein the second SPDM-enabled hardware device comprises at least one memory including instructions that, that upon execution by at least one processor, cause the second SPDM-enabled hardware device to:
    receive one or more policies associated with how transmission through the first and second interfaces are to be randomized;
    receive a second message to be transmitted to the first hardware device;
    segment the second message into a plurality of second group of packets; and
    randomly select either the first or second interface to transmit each of the second group of packets to the first hardware device based on the received policies.

7. The path obfuscation system of claim 1, wherein the first and second interfaces are configured to operate according to at least one of an I2C protocol, an I3C SENSEWIRE protocol, a SPI protocol, and a PCIe VDM channel.

8. The path obfuscation system of claim 7, wherein the protocol of the first and second interfaces use a protocol that is different from one another.

9. A path obfuscation method comprising:
    receiving, using instructions stored in at least one memory and executed by at least one processor, a message to be transmitted from a first security protocol and data model (SPDM)-enabled hardware device to a second (SPDM)-enabled hardware device;
    segmenting, using the instructions, the message into a plurality of groups of packets, each group of packets selected to have a random quantity of packets based on one or more policies; and
    randomly selecting, using the instructions, either a first or second interface to transmit each group of packets to the second hardware device, the first and second interfaces providing communication between the first and second hardware devices using a SPDM protocol, wherein each of the first and second SPDM-enabled hardware devices are configured to communicate using corresponding first and second interfaces with different communication protocols.

10. The path obfuscation method of claim 9, further comprising randomly selecting the first or second interface according to one or more policies established for the communication between the first and second hardware devices, wherein at least one of the policies specifies how the first or second interfaces are randomly selected.

11. The path obfuscation method of claim 10, further comprising receiving the policies from a user via a user interface.

12. The path obfuscation method of claim 9, further comprising, by the second hardware device:
    receiving one or more policies associated with how transmission through the first and second interfaces are to be randomized;
    receiving a second message to be transmitted to the first hardware device;
    segmenting the second message into a plurality of second group of packets; and
    randomly selecting either the first or second interface to transmit each of the second group of packets to the first hardware device based on the received policies.

13. An Information Handling System (IHS), comprising:
    at least one security protocol and data model (SPDM)-enabled hardware device;
    a baseboard management controller (BMC); and
    first and second interfaces configured to provide communication between the BMC and the SPDM-enabled hardware device using a SPDM protocol, wherein each of the SPDM-enabled hardware device and the BMC are configured to communicate using corresponding first and second interfaces with different communication protocols, and
    wherein the BMC comprises at least one memory including instructions that upon execution by at least one processor, cause the BMC to:
        receive a message to be transmitted to the hardware device;
        segment the message into a plurality of group of packets, each group of packets selected to have a random quantity of packets based on one or more policies; and
        randomly select either the first or second interface to transmit each group of packets to the hardware device.

14. The IHS of claim 13, wherein the instructions further cause the BMC to randomly select the first or second interface according to one or more policies established for the communication between the BMC and the hardware device, wherein at least one of the policies specifies how the first or second interfaces are randomly selected.

15. The IHS of claim 14, wherein the instructions further cause the BMC to receive the policies from a user via a user interface.

16. The IHS of claim 13, wherein the SPDM-enabled hardware device comprises at least one memory including instructions that upon execution by at least one processor, cause the SPDM-enabled hardware device to:
    receive one or more policies associated with how transmission through the first and second interfaces are to be randomized;
    receive a second message to be transmitted to the BMC;
    segment the second message into a plurality of second group of packets; and
    randomly select either the first or second interface to transmit each of the second group of packets to the BMC based on the received policies.

17. The IHS of claim 13, wherein the first and second interfaces are configured to operate according to at least one of an I2C protocol, an I3C SENSEWIRE protocol, a SPI protocol, and a PCIe VDM channel, and wherein the protocol of the first and second interfaces use a protocol that is different from one another.

* * * * *